US009680969B2

United States Patent
Kuroiwa

(10) Patent No.: US 9,680,969 B2
(45) Date of Patent: Jun. 13, 2017

(54) COMMUNICATION DEVICE, COMMUNICATION METHOD, AND PROGRAM

(71) Applicant: Takeru Kuroiwa, Tokyo (JP)

(72) Inventor: Takeru Kuroiwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 14/429,006

(22) PCT Filed: Oct. 23, 2012

(86) PCT No.: PCT/JP2012/077315
§ 371 (c)(1),
(2) Date: Mar. 18, 2015

(87) PCT Pub. No.: WO2014/064761
PCT Pub. Date: May 1, 2014

(65) Prior Publication Data
US 2015/0249726 A1   Sep. 3, 2015

(51) Int. Cl.
*H04L 29/06* (2006.01)
*H04L 29/08* (2006.01)
*H04Q 9/00* (2006.01)

(52) U.S. Cl.
CPC .............. *H04L 69/04* (2013.01); *H04L 67/10* (2013.01); *H04Q 9/00* (2013.01)

(58) Field of Classification Search
CPC ............ G06F 11/1453; G06F 11/1448; G06F 17/30156; G06F 17/30159; G06F 3/0641;
(Continued)

(56) References Cited

U.S. PATENT DOCUMENTS

2002/0198990 A1*  12/2002  Bradfield ............ H04L 41/0213
                                                              709/224
2004/0051653 A1    3/2004  Price
(Continued)

FOREIGN PATENT DOCUMENTS

JP    63-153700 A    6/1988
JP    H03-019597 A   1/1991
(Continued)

OTHER PUBLICATIONS

International Search Report of the International Searching Authority mailed Dec. 25, 2012 for the corresponding international application No. PCT/JP2012/077315 (and English translation).

*Primary Examiner* — Ruolei Zong
(74) *Attorney, Agent, or Firm* — Posz Law Group, PLC

(57) ABSTRACT

A duplication identifier, a substitutor, and a memory controller perform the steps of: comparing information newly acquired by an acquirer and information stored in an operation data memory; determining whether or not at least a portion of the newly acquired information matches a portion of the information stored in the operation data memory; when it is determined that there is no matching portion causing the information acquired by the acquirer to be stored in the operation data memory; and when it is determined that at least a portion of the newly acquired information matches a portion of the information stored in the operation data memory, substituting the information of the portion determined to match the information stored in the operation data memory among the newly acquired information with predetermined information with a smaller volume than the information of the portion, and storing the information in the operation data memory.

14 Claims, 8 Drawing Sheets

(58) Field of Classification Search
CPC ... G06F 17/3015; H04Q 9/00; H04L 67/1097;
H04L 67/10; H04L 69/04
USPC .......................................................... 709/247
See application file for complete search history.

(56) References Cited

U.S. PATENT DOCUMENTS

| | | | |
|---|---|---|---|
| 2010/0082672 A1* | 4/2010 | Kottomtharayil ... | G06F 11/1451 707/770 |
| 2011/0016091 A1* | 1/2011 | Prahlad ............... | G06F 11/1453 707/654 |
| 2012/0144032 A1* | 6/2012 | Read ...................... | H04Q 9/00 709/224 |
| 2012/0150826 A1* | 6/2012 | Vijayan Retnamma ........ | G06F 17/30312 707/692 |

FOREIGN PATENT DOCUMENTS

| JP | H05-191454 A | 7/1993 |
|---|---|---|
| JP | H05-236565 A | 9/1993 |
| JP | H08-195986 A | 7/1996 |
| JP | 2001-282858 A | 10/2001 |
| JP | 2003-179984 A | 6/2003 |
| JP | 2004-510371 A | 4/2004 |
| JP | 3731120 B2 | 10/2005 |
| JP | 2006-270544 A | 10/2006 |

\* cited by examiner

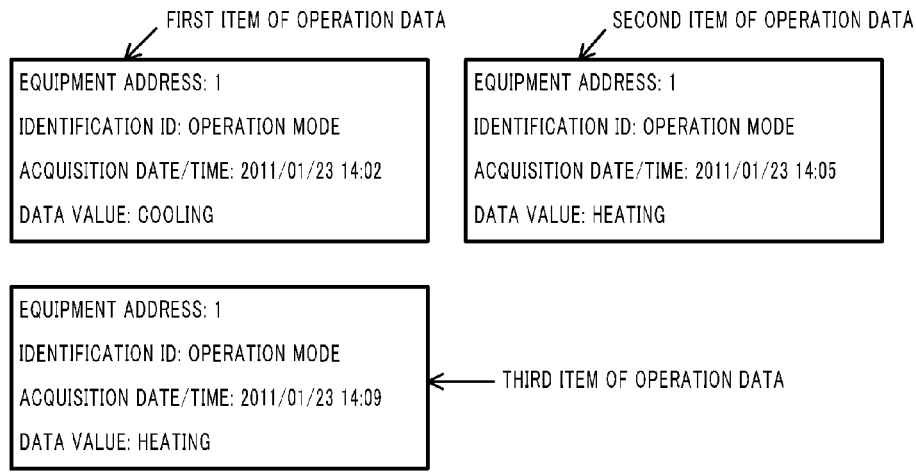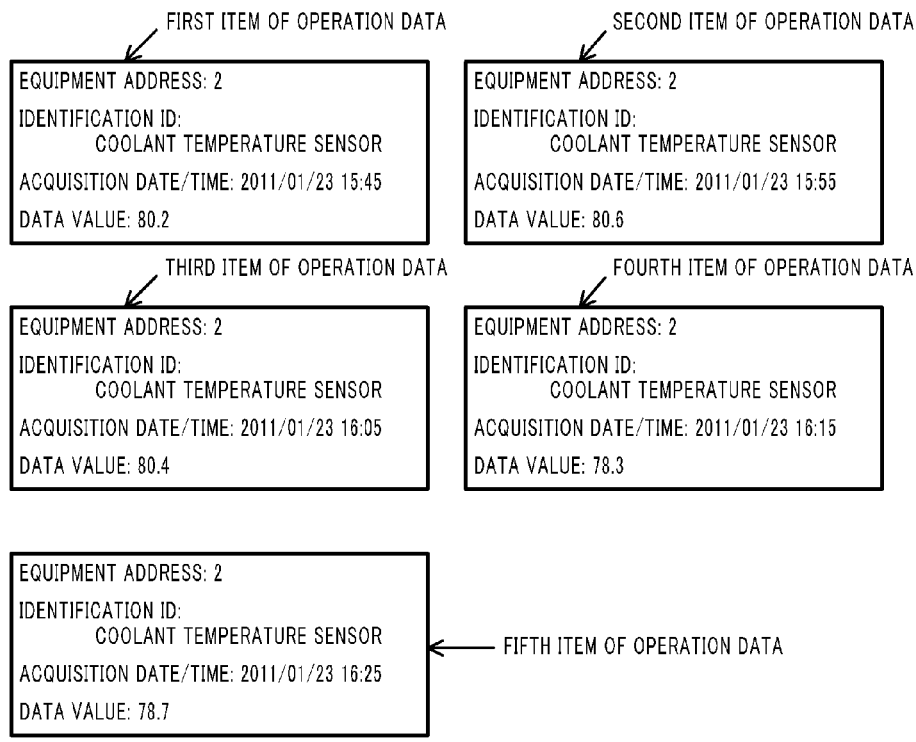

FIG. 4A

| 340 | |
|---|---|
| EQUIPMENT ADDRESS = 1 | |
| IDENTIFICATION ID = OPERATION MODE | |
| ACQUISITION DATE/TIME | DATA VALUE |
| 2011/01/23 14:02 | COOLING |
| (BLANK) : 05 | HEATING |
| (BLANK) : 09 | (BLANK) |

- FIRST ITEM OF OPERATION DATA (rows 1–4)
- SECOND ITEM OF OPERATION DATA
- THIRD ITEM OF OPERATION DATA

FIG. 4B

| 340 | |
|---|---|
| EQUIPMENT ADDRESS = 2 | |
| IDENTIFICATION ID = COOLANT TEMPERATURE SENSOR | |
| ACQUISITION DATE/TIME | DATA VALUE |
| 2011/01/23 15:45 | 80.2 |
| (BLANK) :55 | (BLANK) .6 |
| 2011/01/23 16:05 | (BLANK) .4 |
| (BLANK) :15 | 78.3 |
| (BLANK) :25 | (BLANK) .7 |

- FIRST ITEM OF OPERATION DATA
- SECOND ITEM OF OPERATION DATA
- THIRD ITEM OF OPERATION DATA
- FOURTH ITEM OF OPERATION DATA
- FIFTH ITEM OF OPERATION DATA

FIG. 5A

```
<EQUIPMENT ADDRESS> 1 </EQUIPMENT ADDRESS>
<IDENTIFICATION ID> OPERATION MODE </IDENTIFICATION ID>
<DATA>
 <ACQUISITION DATE/TIME> 2011/01/23 14:02 </ACQUISITION DATE/TIME>
 <DATA VALUE> COOLING </DATA VALUE>
</DATA>
<DATA>
 <ACQUISITION DATE/TIME> 2011/01/23 14:05 </ACQUISITION DATE/TIME>
 <DATA VALUE> HEATING </DATA VALUE>
</DATA>
<DATA>
 <ACQUISITION DATE/TIME> 2011/01/23 14:09 </ACQUISITION DATE/TIME>
 <DATA VALUE> HEATING </DATA VALUE>
</DATA>
```

FIG. 5B

```
"EQUIPMENT ADDRESS", "1"
"IDENTIFICATION ID", "OPERATION MODE"
"ACQUISITION DATE/TIME", "DATA VALUE"
"2011/01/23 14:02", "COOLING"
"2011/01/23 14:05", "HEATING"
"2011/01/23 14:09", "HEATING"
```

COMMUNICATION DEVICE, COMMUNICATION METHOD, AND PROGRAM

CROSS REFERENCE TO RELATED APPLICATION

This application is a U.S. national stage application of PCT/JP2012/077315 filed on Oct. 23, 2012, the disclosure of which is incorporated herein by reference.

TECHNICAL FIELD

The present disclosure relates to a communication device, communication method, and program.

BACKGROUND ART

As a device capable of reducing the volume of information transmitted when transmitting information acquired from another device to an external device, the data logger disclosed in Patent Literature 1, for example, can be cited.

The data logger acquires from devices that are subjects of monitoring sensor values measured at predetermined times by multiple sensors such as hydrogen sensors, electric current sensors and/or the like. Furthermore, the data logger associates each acquired sensor value with information indicating the sensor, and stores such in memory at each time measured.

When transmitting each sensor value to an external device, the data logger aggregates the sensor values stored at each measured time for each piece of information indicating a sensor. Through this, sensor values measured by a common sensor are bundled, so in the case of sensor values in which there is very little fluctuation, sensor values indicating a common value are continuously lined up.

Furthermore, the data logger compresses the sensor values aggregated for each piece of information indicating a sensor for example using a ZIP algorithm, and transmits the compressed information to the external device. In this manner, the data logger makes it possible to continuously line up sensor values indicating a common value, and thereby improves efficiency when compressing and makes it possible to reduce the volume of information transmitted.

CITATION LIST

Patent Literature

Patent Literature 1: Unexamined Japanese Patent Application Kokai Publication No. 2006-270544.

SUMMARY OF INVENTION

Technical Problem

By enabling sensor values indicating a common value to be continuously lined up as described above, the data logger disclosed in Patent Literature 1 makes it possible to improve compression efficiency. Hence, the data logger is unable to compress information when the sensor values do not indicate a common value, in other words when newly acquired information is not the same as previously acquired information, and thus is unable to reduce the volume of information transmitted.

In consideration of the foregoing, it is an objective of the present disclosure to provide a communication device, communication method, and program capable of reducing the volume of information transmitted even when newly acquired information and previously acquired information differ.

Solution to Problem

To achieve the above-described objective, an acquirer of the communication device according to the present disclosure acquires information. A determiner compares information newly acquired by the acquirer and information stored in the information memory and determining whether or not at least a portion of the newly acquired information matches a portion of the information stored in the information memory, and when it is determined that there is no matching portion causes the information acquired by the acquirer to be stored in the information memory, and when it is determined that at least a portion of the newly acquired information matches a portion of the information stored in the information memory, substitutes the information of the portion determined to match the information stored in the information memory among the newly acquired information with predetermined information with a smaller volume than the information of the portion, and causes the information to be stored in the information memory. A transmitter transmits the information stored in the information memory.

Advantageous Effects of Invention

With the present disclosure, it is possible to reduce the volume of information transmitted even when newly acquired information and previously acquired information differ.

BRIEF DESCRIPTION OF DRAWINGS

FIG. 2A is a drawing showing three items of newly acquired operation data;

FIG. 2B is a drawing showing five items of newly acquired operation data;

FIG. 4A is a drawing showing operation data stored in the operation data memory when three items of operation data are newly acquired;

FIG. 4B is a drawing showing operation data stored in the operation data memory when five items of operation data are newly acquired;

FIG. 5A is a drawing showing the operation data in XML format;

FIG. 5B is a drawing showing the operation data in CSV format;

DESCRIPTION OF EMBODIMENTS

Figure 1:
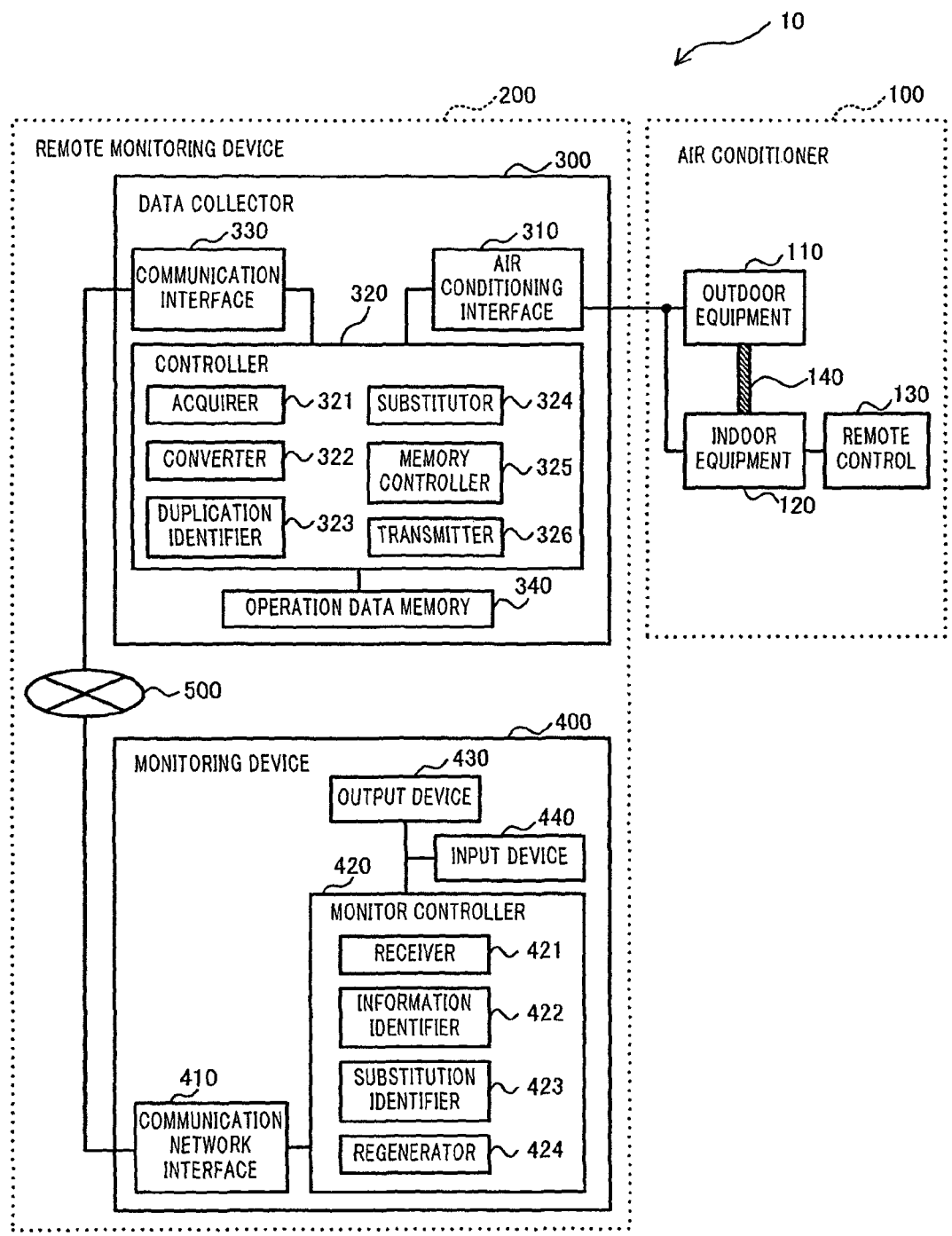
FIG. 1 is a block diagram of a control system according to an exemplary embodiment of the present disclosure.

Below, a monitoring system 10 according to a first exemplary embodiment of the present disclosure is described with reference to FIGS. 1-8. The monitoring system 10 shown in FIG. 1 comprises an air conditioner 100 and a remote monitoring device 200.

The monitoring system 10 is composed so as to be capable of displaying on the remote monitoring device 200 an operation status and/or the like of the air conditioner 100. Hence, it is possible for a user to grasp the operation status and/or the like of the air conditioner 100 by means of the remote monitoring device 200.

The air conditioner 100 comprises outdoor equipment 110, indoor equipment 120 connected to the outdoor equipment 110 via coolant piping 140, and a remote control 130 capable of switching settings for a target temperature of cold air, for example, emitted by the indoor equipment 120, or operation modes of the outdoor equipment 110 and the indoor equipment 120 such as cooling/heating and/or the like.

The outdoor equipment 110, the indoor equipment 120 and the remote control 130 are connected to each other. Hence, the outdoor equipment 110, the indoor equipment 120 and the remote control 130 are capable of communicating with each other.

In addition, the outdoor equipment 110 and the indoor equipment 120 are connected to the remote monitoring device 200. Hence, it is possible for the remote monitoring device 200 to acquire operation data (information) including operation mode and/or the like, for example, from the outdoor equipment 110 or the indoor equipment 120.

The remote monitoring device 200 comprises a data collector 300, and a monitoring device 400 connected to the data collector 300 via a communication network 500.

The data collector 300 receives, and stores in memory, operation data transmitted from the outdoor equipment 110 and the indoor equipment 120.

The data collector 300 comprises an air conditioning interface 310, a controller 320, a communication interface 330 and an operation data memory 340.

The air conditioning interface 310 communicates with the outdoor equipment 110 and the indoor equipment 120.

The controller 320 accomplishes control of the data collector 300. The controller 320 comprises an unrepresented CPU (Central Processing Unit), ROM (Read Only Memory) and RAM (Random Access Memory).

The CPU executes programs stored in the ROM (for example, a program realizing below-described processes shown in FIG. 6 or FIG. 7).

In addition, by the CPU executing programs stored in the ROM, the controller 320 realizes an acquirer 321, a converter 322, a duplication identifier 323, a substitutor 324, a memory controller 325 and a transmitter 326.

The acquirer 321 transmits a transmission request signal to the outdoor equipment 110 and the indoor equipment 120 via the air conditioning interface 310. Furthermore, the acquirer 321, in response to the transmission request signal, acquires operation data transmitted from the outdoor equipment 110 and the indoor equipment 120, and stores such in the RAM.

The converter 322 converts the operation data acquired by the acquirer 321 from binary data into text data that is data in a format that can be distinguished by a user without needing special knowledge.

The operation data converted from binary data to text data by the converter 322 comprises equipment address, identification ID, acquisition date/time and data value. The operation data shown in FIG. 2A was acquired by the acquirer 321 from the outdoor equipment 110. In addition, the operation data shown in FIG. 2B was acquired by the acquirer 321 from the indoor equipment 120.

In the case of the operation data shown in FIG. 2A, the acquirer 321 acquires operation data a total of three times with different timing, from the outdoor equipment 110. In addition, in the case of the operation data shown in FIG. 2B, the acquirer 321 acquires operation data a total of five times with different timing, from the indoor equipment 120.

The equipment address included in the operation data indicates the transmission source of the operation data. In the case of the operation data acquired from the outdoor equipment 110, the equipment address is "1" as shown in FIG. 2A, and in the case of the operation data acquired from the indoor equipment 120, the equipment address is "2", as shown in FIG. 2B.

In addition, the identification ID included in the operation data indicates to what the data value included in the operation data is related. As shown in FIG. 2A, when the identification ID is "operation mode", the data value indicates the specific name of the operation mode. In addition, as shown in FIG. 2B, when the identification ID is "coolant temperature sensor", the data value indicates the temperature of the coolant temperature sensor.

In addition, the acquisition date/time included in the operation data indicates the date and time the operation data was acquired. As shown in the first item of operation data in FIG. 2A, when the acquisition date/time is "2011/01/23 14:02", for example, the acquisition date/time of operation data from the outdoor equipment 110 is 14:02 on Jan. 23, 2011. In addition, as shown in the first item of operation data in FIG. 2B, when the acquisition date/time is "2011/01/23 15:45", the acquisition date/time of operation data from the indoor equipment 120 is 15:45 on Jan. 23, 2011. When the operation data is acquired, the acquirer 321 acquires the date and time measured on a clock possessed by the controller 320, and specifies such as the acquisition date/time.

The data value included in the operation data indicates the operation mode's setting, a sensor's measured value and/or the like. As shown in the first item of operation data in FIG. 2A, when the target specified by the identification ID is "operation mode" and the data value is "cooling", the data value indicates that the operation mode of the outdoor equipment 110 is cooling. In addition, as shown in the first item of operation data in FIG. 2B, when the target specified by the identification ID is "temperature of coolant temperature sensor" and the data value is "80.2", the data value indicates that the measured temperature of the coolant temperature sensor housed in the indoor equipment 120 is 80.2° C.

When new operation data is acquired by the acquirer 321, the duplication identifier 323 shown in FIG. 1 executes the following process on new operation data converted into text data.

The duplication identifier 323 determines whether or not operation data (operation data converted into text data) indicating an equipment address and identification ID matching the equipment address and identification ID included in new operation data converted into text data is stored in the operation data memory 340.

Figure 3:
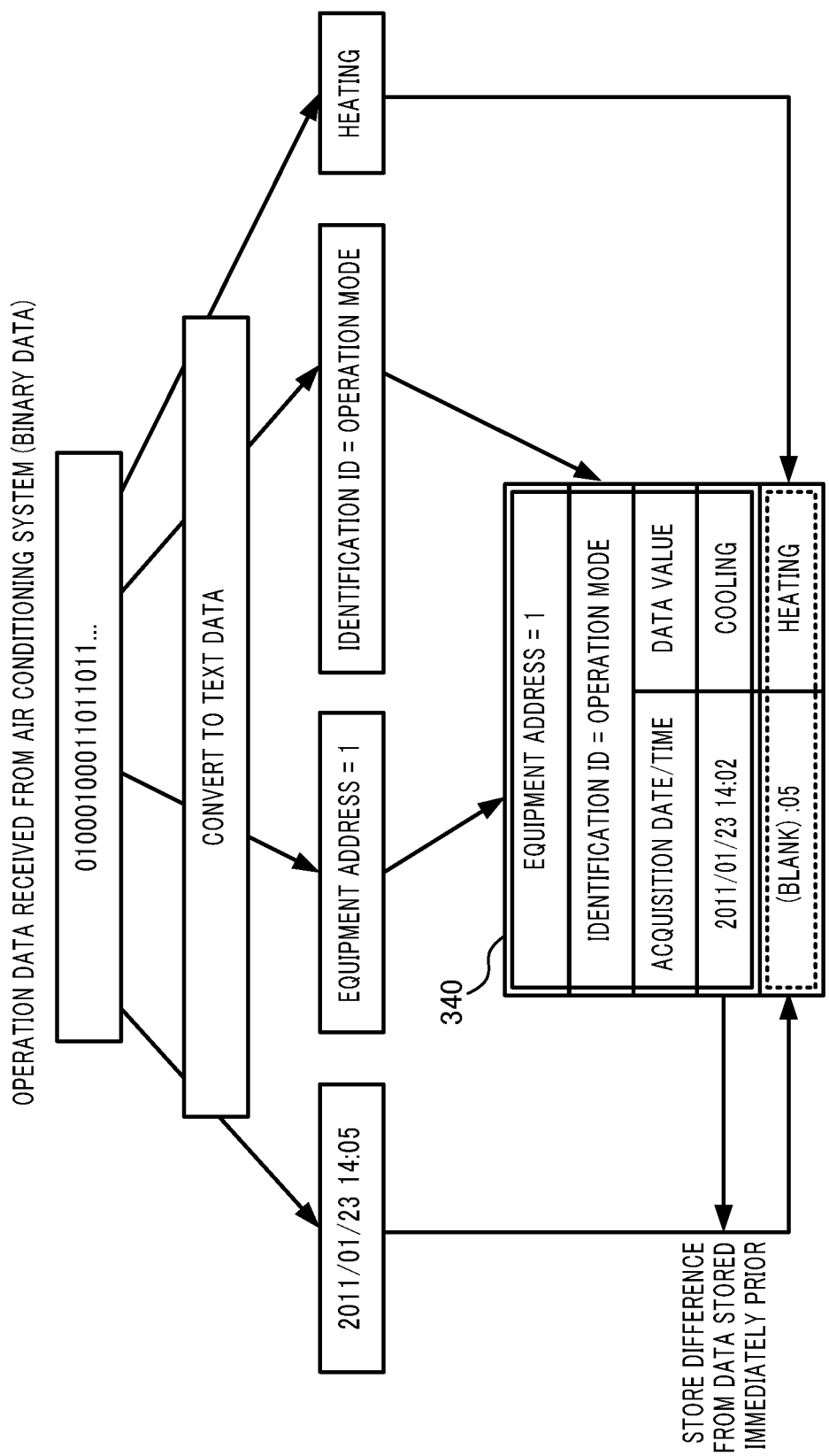
FIG. 3 is a drawing showing a process for adding newly acquired operation data to operation data stored in an operation data memory.

Furthermore, if operation data indicating that the equipment address and identification ID match is not stored in the operation data memory 340, the duplication identifier 323 stores the data in the operation data memory 340 without adding changes to the operation data converted to text data, as indicated by the double frame of FIG. 3.

In addition, if operation data indicating that the equipment address and identification ID match is stored in the operation data memory 340, the duplication identifier 323 compares the contents of the newly acquired operation data and the contents of the unchanged acquired operation data stored in the operation data memory 340 and identifies portions in which the contents are duplicated.

That is to say, the duplication identifier 323 compares the operation data newly acquired by the acquirer 321 and the operation data stored in the operation data memory 340, determines whether or not at least a portion of the newly acquired operation data matches a portion of the operation data stored in the operation data memory 340, and identifies the portion in which the contents are duplicated (the portion that matches).

This process will be described in detail. First, a case in which when new operation data is acquired by the acquirer 321, operation data matching the equipment address and identification ID is stored in the operation data memory 340 is described. In other words, a case in which the duplication identifier 323 has identified that at least a portion of the operation data newly acquired by the acquirer 321 matches a portion of the operation data stored in the operation data memory 340 is described.

Specifically, the explanation supposes that operation data in which the equipment address is "1", the identification ID is "operation mode", the acquisition date/time is "2011/01/23 14:05" and the data value is "heating" (the second item of operation data in FIG. 2A) is newly acquired by the acquirer 321.

The duplication identifier 323 acquires from the operation data memory 340 operation data in which the equipment address is "1", the identification ID is "operation mode", the acquisition date/time is "2011/01/23 14:02" and the data value is "cooling" (the operation data indicated by the double frame portion of FIG. 3). Furthermore, the duplication identifier 323 compares the acquisition date/time "2011/01/23 14:02" of the acquired operation data and the acquisition date/time "2011/01/23 14:05" of the newly acquired operation data and identifies the duplicated portion as "2011/01/23 14".

Following this, the substitutor 324 shown in FIG. 1 substitutes the data included in the newly acquired operation data and indicating the contents of the duplicated portion identified by the duplication identifier 323, in other words the data of the portion identified by the duplication identifier 323 as matching the operation data stored in the operation data memory 340 among the newly acquired operation data, with data (information) that has a smaller volume that than data and is not used in the operation data converted into text data.

Specifically, the substitutor 324 accomplishes the following process. For example, when the duplication identifier identifies the duplicated portion as "2011/01/23 14" as a result of comparing the acquisition date/time "2011/01/23 14:02" of the acquired operation data and the acquisition date/time "2011/01/23 14:05" of the newly acquired operation data, the substitutor 324 deletes the data indicating the duplicated portion "2011/01/23 14" from the newly acquired operation data and substitutes a blank (space), which is data (information) having less volume that the data of the duplicated portion and is not used in the operation data converted into text data. Through this, the data indicating the acquisition date/time of the newly acquired operation data becomes "(blank):5" as indicated by the portion surrounded by a dotted line in FIG. 3. The duplication identifier 323 compares the data value "cooling" of the acquired operation data and the data value "heating" of the newly acquired operation data and identifies that there is no duplicated portion.

Following this, the memory controller 325 shown in FIG. 1 appends the operation data in which the data indicating the contents of the duplicated portion was substituted with a blank (space) by the duplication identifier 323 to the operation data already stored in the operation data memory 340.

Specifically, the memory controller 325 accomplishes the following process. For example, when the substitutor 324 has deleted data indicating the duplicated portion "2011/01/23 14" from the newly acquired operation data and substituted such with a blank (space) that is data (information) having less volume that the data of the duplicated portion, the memory controller 325 appends "(blank):5" indicating the acquisition date/time (the different part of the data) to the operation data already stored in the operation data memory 340, as indicated by the portion surrounded by the dotted line in FIG. 3. In addition, the memory controller 325 appends the data value "heating" that is not a duplicated portion to the operation data already stored in the operation data memory 340, as indicated by the portion surrounded by the dotted line in FIG. 3.

Next, a case in which operation data that matches the equipment address and identification ID is not stored in the operation data memory 340 when new operation data is acquired by the acquirer 321 is described. In other words, a case is described in which the duplication identifier 323 has determined that at least a portion of the operation data newly acquired by the acquirer 321 does not match (there is no matching portion) a portion of the operation data stored in the operation data memory 340.

Specifically, the description supposes that operation data in which the setting equipment address is "1", the identification ID is "operation mode", the acquisition date/time is "2011/01/23 14:02" and the data value is "cooling", for example as shown in the first item of operation data in FIG. 2A, is newly acquired by the acquirer 321.

Because the operation data is not stored in the operation data memory 340, the duplication identifier 323 stores the operation data acquired by the acquirer 321 without change in the operation data memory 340.

At this time, the operation data indicated by the first item of operation data in FIG. 4A is stored in the operation data memory 340.

Following this, when operation data in which the equipment address is "1", the identification ID is "operation mode", the acquisition date/time is "2011/01/23 14:05" and the data value is "heating" is newly acquired by the acquirer 321, as shown by the second item of operation data in FIG. 2A, the duplication identifier 323 acquires the operation data in which the equipment address is "1", the identification ID is "operation mode", the acquisition date/time is "2011/01/23 14:02" and the data value is "heating" (the first item of operation data in FIG. 4A) from the operation data memory 340. Furthermore, the duplication identifier 323 compares the acquisition date/time "2011/01/23 14:02" of the acquired operation data and the acquisition date/time "2011/01/23 14:05" of the newly acquired operation data and identifies the duplicated portion "2011/01/23 14". In addition, the duplication identifier 323 compares the data value "cooling" of the acquired operation data and the data value "heating" of the newly acquired operation data and identifies that there is no duplicated portion.

Furthermore, the substitutor 324 deletes the data indicating the duplicated portion "2011/01/23 14" from the newly acquired operation data (acquisition time), and substitutes such with a blank (space), which is data (information) having smaller volume than the data of the duplicated portion. Through this, the data indicating the acquisition date/time of the newly acquired operation data becomes "(blank):5".

Whereupon, the memory controller 325 appends the "(blank):5" indicating the acquisition date/time to the operation data already stored in the operation data memory 340, as shown in the second item of operation data in FIG. 4A. In addition, the memory controller 325 appends the data value "heating" that is not the duplicated portion to the operation data already stored in the operation data memory 340.

Following this, when operation data in which the equipment address is "1", the identification ID is "operation mode", the acquisition date/time is "2011/01/23 14:09" and the data value is "heating" is newly acquired by the acquirer 321, as shown by the third item of operation data in FIG. 2A, the duplication identifier 323 acquires the operation data in which the equipment address is "1", the identification ID is "operation mode", the acquisition information is "2011/01/23 14:02", indicating an acquisition timing that is most recent among acquisition dates/times not containing a blank (space), and the data value is "heating", indicating an acquisition timing that is most recent among data values not containing a blank (space) (the first item of operation data in FIG. 4A) from the operation data memory 340. Furthermore, the duplication identifier 323 compares the acquisition date/time "2011/01/23 14:02" of the acquired operation data and the acquisition date/time "2011/01/23 14:09" of the newly acquired operation data and identifies the duplicated portion "2011/01/23 14". In addition, the duplication identifier 323 compares the data value "heating" of the acquired operation data and the data value "heating" of the newly acquired operation data and identifies "heating" as the duplicated portion.

Furthermore, the substitutor 324 deletes the data indicating the duplicated portion "2011/01/23 14" from the newly acquired operation data (acquisition time), and substitutes such with a blank (space), which is data (information) having smaller volume than the data of the duplicated portion. Through this, the data indicating the acquisition date/time of the newly acquired operation data becomes "(blank):9". In addition, the substitutor 324 deletes the data indicating the duplicated portion "heating" from the newly acquired operation data (data value), and substitutes such with a blank (space), which is data (information) having smaller volume than the data of the duplicated portion. Through this, the data indicating the data value of the newly acquired operation data becomes "(blank)".

Whereupon, the memory controller 325 appends the "(blank):9" indicating the acquisition date/time to the operation data already stored in the operation data memory 340, as shown in the third item of operation data in FIG. 4A. In addition, the memory controller 325 appends "(blank)" indicating the data value to the operation data already stored in the operation data memory 340.

In addition, when operation data in which the equipment address is "2", the identification ID is "coolant temperature sensor", the acquisition date/time is "2011/01/23 15:45" and the data value is "80.2" is newly acquired by the acquirer 321, as shown in the first item of operation data in FIG. 2B, the duplication identifier 323 stores the operation data acquired by the acquirer 321 in the operation data memory 340 without change because no operation data is stored in the operation data memory 340.

At this time, the operation data indicated by the first item of operation data in FIG. 4B is stored in the operation data memory 340.

Following this, when operation data in which the equipment address is "2", the identification ID is "coolant temperature sensor", the acquisition date/time is "2011/01/23 15:55" and the data value is "80.6" is newly acquired by the acquirer 321, as shown in the second item of operation data in FIG. 2B, the duplication identifier 323 acquires from the operation data memory 340 the equipment address of "2", the identification ID of "coolant temperature sensor", the acquisition date/time of "2011/01/23 15:45" and the data value of "80.2" (the first operation data of FIG. 4B). Furthermore, the duplication identifier 323 compares the acquisition date/time "2011/01/23 15:45" of the acquired operation data and the acquisition date/time "2011/01/23 15:55" of the newly acquired operation data and identifies the duplicated portion "2011/01/23 15". In addition, the duplication identifier 323 compares the data value "80.2" of the acquired operation data and the data value "80.6" of the newly acquired operation data and identifies the duplicated portion "80".

Furthermore, the substitutor 324 deletes the data indicating the duplicated portion "2011/01/23 15" from the newly acquired operation data (acquisition time) and substitutes a blank (space), which is data (information) having a smaller volume than the data of the duplicated portion. Through this, the data indicating the acquisition date/time of the newly acquired operation data becomes "(blank):55". In addition, the substitutor 324 deletes the data indicating the duplicated portion "80" from the newly acquired operation data (data value), and substitutes a blank (space), which is data (information) having a smaller volume that the data of the duplicated portion. Through this, the data indicating the data value of the newly acquired operation data becomes "(blank).6".

Whereupon, the memory controller 325 appends "(blank):55" indicating the acquisition date/time to the operation data already stored in the operation data memory 340, as shown in the second item of operation data in FIG. 4A. In addition, the memory controller 325 appends "(blank).6" indicating the data value to the operation data already stored in the operation data memory 340.

Following this, when operation data in which the equipment address is "2", the identification ID is "coolant temperature sensor", the acquisition date/time is "2011/01/23 16:05" and the data value is "80.4" is newly acquired by the acquirer 321, as shown in the third item of operation data in FIG. 2B, the duplication identifier 323 acquires from the operation data memory 340 acquisition information "2011/01/23 15:06" indicating the most recent acquisition time out of the acquisition dates/times not containing a blank (space) but with an equipment address of "2" and an identification ID of "coolant temperature sensor", and a data value of "80.2" indicating the most recent acquisition timing for data values not containing a blank (space) (the first item of operation data in FIG. 4B). Furthermore, the duplication identifier 323 compares the acquisition date/time "2011/01/23 15:06" of the acquired operation data and the acquisition date/time "2011/01/23 16:05" of the newly acquired operation data and identifies that there is no duplicated portion. In addition, the duplication identifier 323 compares the data value "80.2" of the acquired operation data and the data value "80.4" of the newly acquired operation data, and identifies the duplicated portion "80".

Furthermore, the substitutor 324 deletes the data indicating the duplicated portion "80" from the newly acquired operation data (data value), and substitutes a blank (space), which is data (information) having a smaller volume that the data of the duplicated portion. Through this, the data indicating the data value of the newly acquired operation data becomes "(blank).4".

Whereupon, the memory controller 325 appends the acquisition date/time "2011/01/23 16:05" with no duplicated portion to the operation data already stored in the operation data memory 340, as shown in the third item of operation data in FIG. 4A. In addition, the memory controller 325 appends "(blank).4" indicating the data value to the operation data already stored in the operation data memory 340.

Following this, when operation data in which the equipment address is "2", the identification ID is "coolant temperature sensor", the acquisition date/time is "2011/01/23 16:15" and the data value is "78.3" is newly acquired by the acquirer 321, as shown in the fourth item of operation data in FIG. 2B, the duplication identifier 323 acquires from the operation data memory 340 the equipment address of "2", the identification ID of "coolant temperature sensor", the acquisition information "2011/01/23 16:05" indicating the most recent acquisition timing for acquisition dates/times not containing a blank (space) (the third item of operation data in FIG. 4B) and a data value of "80.2" indicating the most recent acquisition timing for data values not containing a blank (space) (the first item of operation data in FIG. 4B). Furthermore, the duplication identifier 323 compares the acquisition date/time "2011/01/23 16:05" of the acquired operation data and the acquisition date/time "2011/01/23 16:15" of the newly acquired operation data and identifies the duplicated portion "2011/01/23 16". In addition, the duplication identifier 323 compares the data value "80.2" of the acquired operation data and the data value "78.3" of the newly acquired operation data, and identifies that there is no duplicated portion.

Furthermore, the substitutor 324 deletes the data indicating the duplicated portion "2011/01/23 16" from the newly acquired operation data (acquisition time) and substitutes a blank (space), which is data (information) having a smaller volume than the data of the duplicated portion. Through this, the data indicating the acquisition date/time of the newly acquired operation data becomes "(blank):15".

Whereupon, the memory controller 325 appends "(blank): 15" indicating the acquisition date/time to the operation data already stored in the operation data memory 340, as shown in the fourth item of operation data in FIG. 4A. In addition, the memory controller 325 appends the data value "78.3" that has no duplicated portion to the operation data already stored in the operation data memory 340.

Finally, when operation data in which the equipment address is "2", the identification ID is "coolant temperature sensor", the acquisition date/time is "2011/01/23 16:25" and the data value is "78.7" is newly acquired by the acquirer 321, as shown in the fifth item of operation data in FIG. 2B, the duplication identifier 323 acquires from the operation data memory 340 the equipment address of "2", the identification ID of "coolant temperature sensor", the acquisition information "2011/01/23 16:05" indicating the most recent acquisition timing for acquisition dates/times not containing a blank (space) (the third item of operation data in FIG. 4B) and a data value of "78.3" indicating the most recent acquisition timing for data values not containing a blank (space) (the fourth item of operation data in FIG. 4B). Furthermore, the duplication identifier 323 compares the acquisition date/time "2011/01/23 16:05" of the acquired operation data and the acquisition date/time "2011/01/23 16:25" of the newly acquired operation data and identifies the duplicated portion "2011/01/23 16". In addition, the duplication identifier 323 compares the data value "78.3" of the acquired operation data and the data value "78.7" of the newly acquired operation data, and identifies the duplicated portion "78".

Furthermore, the substitutor 324 deletes the data indicating the duplicated portion "2011/01/23 16" from the newly acquired operation data (acquisition time) and substitutes a blank (space), which is data (information) having a smaller volume than the data of the duplicated portion. Through this, the data indicating the acquisition date/time of the newly acquired operation data becomes "(blank):25". In addition, the substitutor 324 deletes the data indicating the duplicated portion "78" from the newly acquired operation data (data value), and substitutes a blank (space), which is data (information) having a smaller volume that the data of the duplicated portion. Through this, the data indicating the data value of the newly acquired operation data becomes "(blank).7".

Whereupon, the memory controller 325 appends "(blank): 25" indicating the acquisition date/time to the operation data already stored in the operation data memory 340, as shown in the fifth item of operation data in FIG. 4A. In addition, the memory controller 325 appends the data value "(blank).7" indicating the data value to the operation data already stored in the operation data memory 340.

In this manner, the duplication identifier 323 identifies the duplicated portion of the acquisition date/time and of the data value, and the substitutor 324 substitutes a blank (space) for the identified duplicated portion. Hence, even if the acquisition dates/times (information contents) differ, and in addition even if the data values (information contents) differ, it is possible to reduce the volume of data used in expressing the acquisition date/time and the data value.

The transmitter 326 shown in FIG. 1 reads the operation data stored in the operation data memory 340 including the operation data appended by the memory controller 325 and transmits the operation data read to the communication interface 330, when a data transmission request signal transmitted from the monitoring device 400 is received.

The communication interface 330 is connected to the communication network 500. The communication interface 330 intermediates communication with the monitoring device 400. Hence, upon acquiring operation data transmitted by the transmitter 326, the communication interface 330 transmits the acquired operation data to the monitoring device 400 via the communication network 500.

The operation data memory 340 comprises, for example, a memory such as a flash memory, an HDD (Hard Disk Drive) and/or the like. The operation data memory 340 stores operation data (see FIGS. 3, 4A and 4B) including data appended by the memory controller 325.

The monitoring device 400 transmits to the data collector 300 a signal (data transmission request signal) requesting transmission of operation data corresponding to an equipment address, identification ID and time range information (information indicating a time range) specified by a user. In addition, the monitoring device 400 receives the operation data transmitted from the data collector 300 in response to the data transmission request signal.

The monitoring device 400 comprises a communication network interface 410, a monitor controller 420, an output device 430 and an input device 440.

The communication network interface 410 is connected to the communication network 500. The communication network interface 410 intermediates communication with the data collector 300. Hence, the communication network interface 410, upon receiving the data transmission request signal transmitted by the monitor controller 420, transmits the data transmission request signal received to the data collector 300 via the communication network 500. In addition, the communication network interface 410, upon receiving the operation data transmitted by the data collector 300, transmits the operation data received to the monitor controller 420.

The monitor controller 420 accomplishes control of the monitoring device 400. The monitor controller 420 comprises an unrepresented CPU, ROM and RAM.

The CPU executes programs stored in the ROM (for example, a program realizing the below-described process shown in FIG. 8).

In addition, by the CPU executing the programs stored in the ROM, the monitor controller 420 realizes a receiver 421, an information identifier 422, a substitution identifier 423 and a regenerator 424.

When an equipment address, identification ID and time range are specified by user operation of the input device 440, the receiver 421 generates a data transmission request signal including information indicating the specified equipment address, identification ID and time range, and transmits the signal to the data collector 300.

Whereupon, the transmitter 326 of the data collector 300 extracts operation data corresponding to the equipment address, identification ID and time range included in the data transmission request signal from the operation data memory 340, and transmits the extracted operation data to the monitoring device 400.

Following this, the receiver 421 receives the operation data transmitted from the transmitter 326 of the data collector 300.

The information identifier 422 identifies the acquisition dates/times and data values containing blanks (spaces) and the acquisition dates/times and data values not containing blanks, included in the operation data received by the receiver 421.

The substitution identifier 423 compares the acquisition dates/times containing blanks (spaces) and the acquisition dates/times not containing blanks, identified by the information identifier 422, and identifies data substituted with the blanks. In addition, the substitution identifier 423 compares the data values containing blanks (spaces) and the data values not containing blanks, identified by the information identifier 422, and identifies data substituted with the blanks.

Furthermore, the regenerator 424 accomplishes regeneration of the acquisition dates/times and the data values by substituting the data identified by the substitution identifier 423 for the blanks (spaces).

For example, when the operation information shown in FIG. 4A is received by the receiver 421, first the information identifier 422 identifies the acquisition dates/times "(blank):05" and "(blank):09" and the data value "(blank)" containing blanks (spaces), and the acquisition date/time "2011/01/23 14:02" and the data values "cooling" and "heating" not containing blanks, contained in the operation data received by the receiver 421.

Next, the substitution identifier 423 compares the acquisition dates/times "(blank):05" and "(blank):09" containing a blank (space), identified by the information identifier 422, and the acquisition date/time "2011/01/23 14:02" not containing a blank, and identifies the data "2011/01/23 14" that was changed into a blank. In addition, the substitution identifier 423 compares the data value "(blank)" containing a blank "(blank)", identified by the information identifier 422, and the data value "heating" indicating the most recent acquisition timing, out of the data values "cooling" and "heating" not containing a blank (space) and indicating an acquisition timing prior to the acquisition timing of the data value "(blank)", and identifies the data "heating" that was changed into a blank.

Furthermore, the regenerator 424 substitutes the data identified by the substitution identifier 423 for the blanks (spaces), and regenerates the acquisition dates/times and the data values, and specifically regenerates the acquisition date/time "2011/01/23 14:05" and the data value "heating", and the acquisition date/time "2011/01/23 14:09" and the data value "heating".

In addition, for example when the receiver 421 has received the operation information shown in FIG. 4B, first the information identifier 422 identifies the acquisition dates/times "(blank):55", "(blank):15" and "(blank):25" and the data values "(blank).6", "(blank).4" and "(blank).7" containing blanks (spaces) and contained in the operation data received by the receiver 421, and the acquisition dates/times "2011/01/23 15:06" and "2011/01/23 16:05" and the data values "80.2" and "78.3" not containing blanks.

Next, the substitution identifier 423 compares the acquisition date/time "(blank):55" containing a blank (space), identified by the information identifier 422, and the acquisition date/time "2011/01/23 15:06" not containing a blank (space) and indicating an acquisition timing prior to the acquisition timing of the acquisition date/time "(blank):55", and identifies the data "2011/01/23 15" that was changed into a blank.

In addition, the substitution identifier 423 compares the acquisition dates/times "(blank):15" and "(blank):25" containing blanks (spaces), identified by the information identifier 422, and the acquisition date/time "2011/01/23 16:05" indicating the most recent acquisition timing, out of the acquisition dates/times "2011/01/23 15:06" and "2011/01/23 16:05" not containing a blank (space) and indicating an acquisition timing prior to the acquisition timing of the acquisition dates/times "(blank):15" and "(blank):25", and identifies the data "2011/01/23 16" that was changed into a blank.

In addition, the substitution identifier 423 compares the data values "(blank).6" and "(blank).4" containing blanks (spaces), identified by the information identifier 422, and the data value "80.2" not containing a blank (space) and indicating an acquisition timing prior to the acquisition timing of the data values "(blank).6" and "(blank).4", and identifies the data "80" that was changed into a blank.

In addition, the substitution identifier 423 compares the data value "(blank).7" containing a blank (space), identified by the information identifier 422, and the data value "78.3" indicating the most recent acquisition timing out of the data values "80.2" and "78.3" not containing blanks (spaces) and indicating an acquisition timing prior to the acquisition timing of the data value "(blank).7", and identifies the data "78" that was changed into a blank.

Furthermore, the regenerator 424 regenerates the acquisition dates/times and the data values by substituting the data identified by the substitution identifier 423 for the blanks (spaces), and specifically regenerates the acquisition date/time "2011/01/23 15:55" and data value "80.6", the acquisition date/time "2011/01/23 16:05" and data value "80.4", the acquisition date/time "2011/01/23 16:15" and data value "78.3" and the acquisition date/time "2011/01/23 16:25" and data value "78.7".

When there is a possibility that the above-described regeneration of acquisition dates/times and data values is not accomplished correctly by the regenerator 424, specifically when the transmitter 326 of the data collector 300 extracts operation data corresponding to the equipment address, identification ID and time range, and a blank (space) is contained in the acquisition date/time or the data value indicating the oldest acquisition timing from among the acquisition dates/times extracted or the data values extracted, the transmitter 326 makes it so that regeneration by the regenerator 424 is accomplished correctly by regenerating the portion substituted with a blank as follows.

That is to say, the transmitter 326 first retrieves from the operation data memory 340 the acquisition date/time indicating the most recent acquisition timing out of the acquisition dates/times not containing a blank (space) and indicating an acquisition timing prior to the acquisition date/time indicating the oldest acquisition timing among the extracted acquisition dates/times. Furthermore, the transmitter 326 compares the contents of the retrieved acquisition date/time and the contents of the acquisition date/time indicating the oldest acquisition timing among the extracted acquisition dates/times, and identifies the data substituted with a blank. Following this, the transmitter 326 regenerates the acquisition date/time indicating the oldest acquisition timing, substituting the identified data for the blank contained in the acquisition date/time indicating the oldest acquisition timing. Then, the transmitter 326 extracts the operation data containing the regenerated acquisition date/time.

Similarly, the transmitter 326, for data values, retrieves from the operation data memory 340 the data value indicating the most recent acquisition timing among the data values not containing a blank (space) and indicating an acquisition timing prior to the data value indicating the oldest acquisition timing among the extracted data values. Then, the transmitter 326 compares the contents of the retrieved data value and the contents of the data value indicating the oldest acquisition timing among the extracted data values, and identifies the data substituted with a blank. Following this, the transmitter 326 regenerates the data value indicating the oldest acquisition timing by substituting the identified data for the blank contained in the data value indicating the oldest acquisition timing among the extracted data values. Then, the transmitter 326 extracts the operation data containing the regenerated data value.

For example, when the second item of operation data and the third item of operation data in FIG. 4B were extracted, the transmitter 326 first, for acquisition date/time, retrieves from the operation data memory 340 the acquisition date/time "2011/01/23 15:06" indicating the most recent acquisition timing among the acquisition dates/times not containing a blank (space) and indicating an acquisition timing prior to the acquisition date/time "(blank):55" indicating the oldest acquisition timing among the extracted acquisition dates/times. Then, the transmitter 326 compares the contents "2011/01/23 15:06" of the retrieved acquisition date/time and the contents of the "(blank):55" that is the acquisition date/time indicating the oldest acquisition timing among the extracted acquisition dates/times, and identifies the data "2011/01/23 15" as substituted with the blank. Following this, the transmitter 326 regenerates the acquisition date/time by substituting "2011/01/23 15" that is the identified data for the blank in the "(blank):55" contained in the acquisition date/time indicating the oldest acquisition timing among the extracted acquisition dates/times. Then, the transmitter 326 extracts the operation data containing the regenerated acquisition date/time "2011/01/23 15:55".

Similarly, when the second item of operation data and the third item of operation data in FIG. 4B were extracted, the transmitter 326, for the data value, retrieves from the operation data memory 340 the data value "80.2" indicating the most recent acquisition timing among the acquisition dates/times not containing blanks (spaces) and indicating an acquisition timing prior to the data value "(blank).6" indicating the oldest acquisition timing among the extracted data values. Furthermore, the transmitter 326 compares the contents "80.2" of the retrieved data value and the contents of the "(blank).6" that is the data value indicating the oldest acquisition timing among the extracted data values, and identifies the data "80" as substituted with the blank. Following this, the transmitter 326 regenerates the data value by substituting "80" that is the identified data for the blank in the "(blank).6" contained in the data value indicating the oldest acquisition timing among the extracted data values. Then, the transmitter 326 extracts the operation data containing the regenerated data value "80.6".

In this manner, the transmitter 326 makes it so that regeneration by the regenerator 424 is accomplished correctly. Hence, regeneration by the regenerator 424 not being possible as a result of being unable to identify that data substituted with a blank because a blank (space) is contained in the acquisition date/time or the data value indicating the oldest acquisition timing among the extracted acquisition dates/times or extracted data values is prevented.

The regenerator 424 shown in FIG. 1 generates operation data in XML (Extensible Markup Language) format from the regenerated operation data.

For example, when the receiver 421 has received the operation data shown in FIG. 4A, the regenerator 424 generates the operation data in XML format shown in FIG. 5A.

It would be fine for the regenerator 424 to generate operation data in CSV (Comma Separated Values) format in place of XML format, from the operation data received by the operation data receiver 421.

In this case, when the receiver 421 has received the operation data shown in FIG. 4A, the regenerator 424 generates the operation data in CSV format shown in FIG. 5B.

The output device 430 shown in FIG. 1 is, for example, a liquid crystal display. The output device 430 displays the operation data in XML format, for example, regenerated by the regenerator 424, for example.

The input device 440 is, for example, a keyboard or a touch panel. The input device 440 receives a selection of operation data to be transmitted to the data collector 300, for example, by an equipment address, identification ID and time range being specified by a user.

Figure 6:
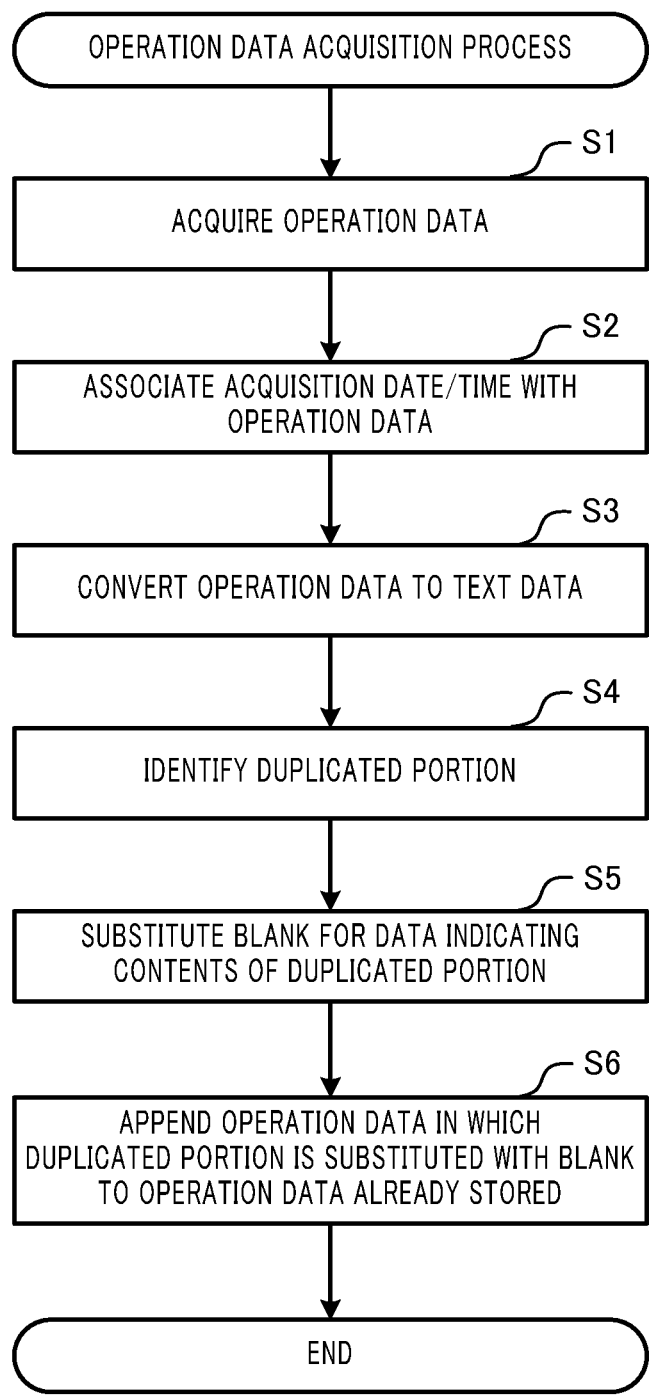
FIG. 6 is a flowchart showing an operation data acquisition process.

An operation data acquisition process executed by the controller 320 of the data collector 300 when the power source of the above-described data collector 300 is on and a time preset by a user is reached is as shown in FIG. 6.

In the operation data acquisition process, first the controller 320 (acquirer 321) transmits a transmission request signal to the outdoor equipment 110 and the indoor equipment 120 via the air conditioning interface 310 (step S1).

Then, the controller 320 (acquirer 321) acquires the operation data transmitted from the outdoor equipment 110 and the indoor equipment 120 in response to the transmission request signal, and stores the acquired operation data in RAM in association with the acquisition date/time (step S2).

Following this, the controller 320 (converter 322) converts the operation data acquired by the acquirer 321 from binary data to data (text data) in a format distinguishable by a user without requiring special knowledge (step S3).

Then, the controller 320 (duplication identifier 323) executes the following process in step S4 on the operation data converted into text data. That is to say, the controller 320 (duplication identifier 323) determines whether or not operation data (operation data converted into text data) indicating an equipment address and identification ID matching the equipment address and identification ID contained in the operation data converted into text data is stored in the operation data memory 340.

Then, if operation data matching the equipment address and the identification ID is not stored in the operation data memory 340, the controller 320 (duplication identifier 323) stores the operation data converted into text data in the operation data memory 340 without change. In addition, if operation data matching the equipment address and the identification ID is stored in the operation data memory 340, the controller 320 (duplication identifier 323) compares the contents of the newly acquired operation data and the contents of the operation data (operation data containing no blanks) stored in the operation data memory 340 and acquired, and identifies the portion where the contents are duplicated.

Following this, the controller 320 (substitutor 324) substitutes a blank (space), which is data that is not used in the operation data converted into text data and is data (information) having a smaller volume than the data of the duplicated portion, for the data indicating the contents of the duplicated portion identified by the duplication identifier 323 contained in the newly acquired operation data (step S5).

Then, the controller 320 (memory controller 325) appends to the operation data already stored in the operation data memory 340 the operation data in which the data indicating the contents of the duplicated portion is substituted with a blank (space) by the duplication identifier 323 (step S6).

Following this, the controller 320 concludes this operation data acquisition process.

Figure 7:
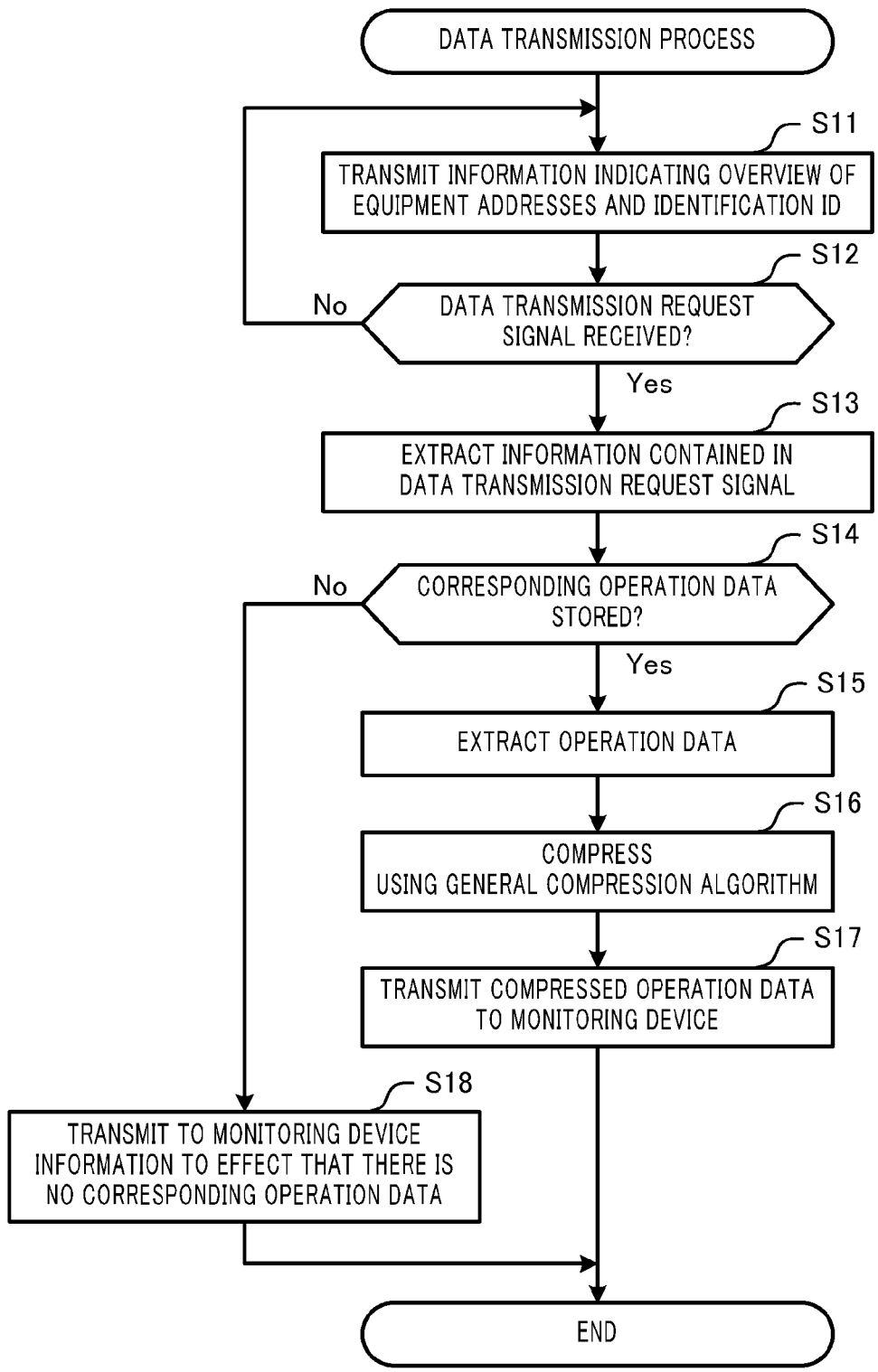
FIG. 7 is a flowchart showing a data transmission process.

Next, a data transmission process executed by the controller 320 of the data collector 300 when the power source of the data collector 300 is on and a connection request is received from the monitoring device 400 by user operation of the input device 440 is as shown in FIG. 7.

In the data transmission process, first the controller 320 acquires equipment addresses and identification IDs from the operation data stored in the operation data memory 340, and transmits information indicating a summary of the acquired equipment addresses and identification IDs to the monitoring device 400 that transmitted the connection request (step S11).

Following this, the controller 320 (transmitter 326) determines whether or not a data transmission request signal transmitted from the monitoring device 400 was received (step S12).

When a data transmission request signal has not been received (step S12: No), the controller 320 (transmitter 326) returns the process to step S11.

On the other hand, when a data transmission request signal was received (step S12: Yes), the controller 320 (transmitter 326) extracts information indicating the equipment address, identification ID and time range, contained in the data transmission request signal (step S13).

Then, the controller 320 (transmitter 326) determines whether or not operation data in which the extracted equipment address and identification ID match and in which an acquisition date/time in the extracted time range is contained is stored in the operation data memory 340 (step S14).

At this time, when a blank is contained in the acquisition date/time stored in the operation data memory 340, the controller 320 (transmitter 326) changes the acquisition date/time in which a blank is contained into an acquisition date/time provisionally not containing a blank, as follows, and determines whether or not operation data in which an acquisition date/time in the time range extracted from the data transmission request signal is contained is stored.

That is to say, the controller 320 (transmitter 326) identifies an acquisition date/time and data value containing a blank (space) and an acquisition date/time and data value not containing a blank, from operation data matching the equipment address and identification ID extracted from the data transmission request signal.

Then, the controller 320 (transmitter 326) compares the acquisition date/time containing a blank (space) and the acquisition date/time not containing a blank, and identifies the data changed to a blank. Furthermore, the controller 320 (transmitter 326) substitutes the identified data for the blank (space), temporarily changing the data into an acquisition date/time not containing a blank. This process in the transmitter 326 is the same process as in the information identifier 422, the substitution identifier 423 and the regenerator 424 of the monitoring device 400.

Then, the controller 320 (transmitter 326) determines whether or not operation data corresponding to the equipment address, identification ID and time range contained in the data transmission request signal are stored in the operation data memory 340.

The controller 320 (transmitter 326), upon completing the above-described determination, returns the acquisition date/time temporarily changed into data not containing a blank, to an acquisition date/time containing a blank.

When the controller 320 (transmitter 326) determines in step S14 that corresponding operation data is not stored in the operation data memory 340 (step S14: No), information to the effect that there is no corresponding operation data is transmitted (step S18) and the data transmission process concludes.

On the other hand, when the controller 320 (transmitter 326) determines that corresponding operation data is stored in the operation data memory 340 (step S14: Yes), the corresponding operation data is extracted from the operation data memory 340 (step S15).

At this time, when a blank (space) is contained in the acquisition date/time or data value indicating the oldest acquisition timing among the extracted acquisition dates/times or the extracted data values, the controller 320 (transmitter 326) substitutes the data prior to substitution with a blank for the portion substituted with a blank and regenerates the acquisition date/time or the data value.

Furthermore, the controller 320 (transmitter 326) compresses the extracted operation data containing the regenerated acquisition date/time or data value using a general-purpose compression algorithm (for example, a reversible compression algorithm such as run length compression, ZIP compression and/or the like, for example) (step S16), transmits the compressed operation data to the monitoring device 400 that transmitted the connection request (step S17) and concludes this data transmission process.

Figure 8:
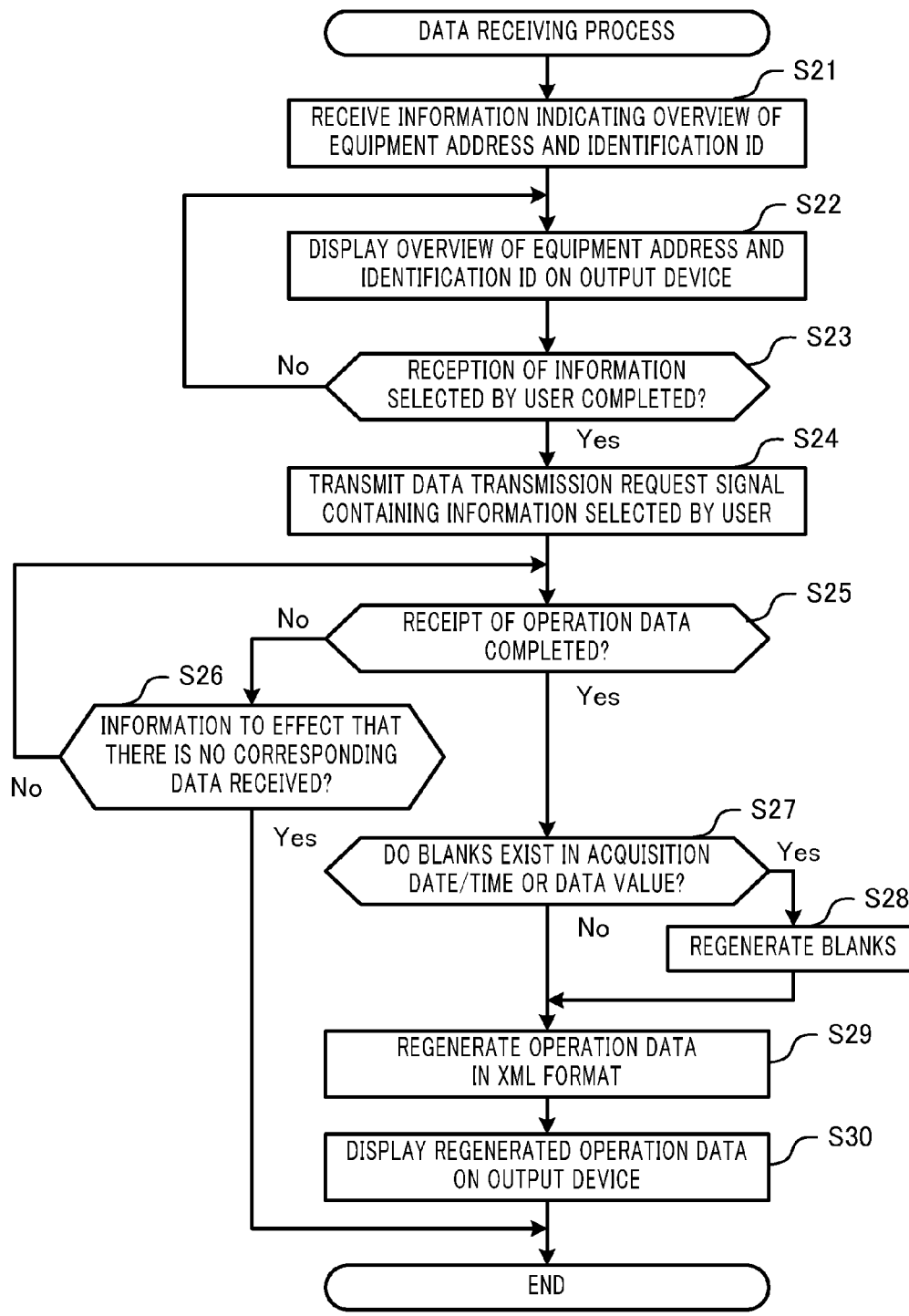
FIG. 8 is a flowchart showing a data receiving process.

Next, the data receiving process executed by the monitor controller 420 when the power source of the monitoring device 400 is on and connection to the data collector 300 is ordered by user operation of the input device 440 is as shown in FIG. 8.

In the data transmission process, first the monitor controller 420 receives information indicating an overview of the equipment address and the identification ID transmitted from the data collector 300 (step S21).

Following this, the monitor controller 420 generates a screen showing an overview of the equipment address and the identification ID from the received information, and displays the generated screen on the output device 430 (step S22).

Then, the monitor controller 420 determines whether or not reception of the equipment address, identification ID and time range selected by the user is completed (step S23).

When it is determined that reception of the equipment address, identification ID and time range is not completed (step S23: No), the monitor controller 420 repeatedly executes the processes of step S22 and step S23 until reception is completed. On the other hand, when it is determined that reception of the equipment address, the identification ID and the time range is completed (step S23: Yes), the monitor controller 420 executes step S24.

That is to say, the monitor controller 420 (receiver 421) generates a data transmission request signal containing information indicating the equipment address, identification ID and time range selected by the user, and transmits the generated data transmission request signal to the data collector 300 (step S24).

Following this, the monitor controller 420 (receiver 421) determines whether or not compressed operation data transmitted from the data collector 300 in response to the data transmission request signal was received (step S25).

When it is determined that compressed operation data has not been received (step S25: No), the monitor controller 420 (receiver 421) determines whether or not information to the effect that there is no corresponding operation data has been received (step S26).

When it is determined that information to the effect that there is no corresponding operation data has not been received (step S26: No), the monitor controller 420 (receiver 421) returns the process to step S25.

On the other hand, when it is determined that information to the effect that there is no corresponding operation data has been received (step S26: Yes), the monitor controller 420 (receiver 421) concludes this data receiving process.

In addition, when it is determined in step S25 that compressed operation data sent from the data collector 300 has been received (step S25: Yes), the monitor controller 420 (receiver 421) decompresses the compressed operation data and moves to step S27.

In step S27, the monitor controller 420 (information identifier 422) determines whether or not there is a blank in the acquisition date/time or data value of the operation data received by identifying the acquisition dates/times and data values containing blanks (spaces) contained in the operation data received, and acquisition dates/times and data values not containing blanks (step S27).

When it is determined by the monitor controller 420 (information identifier 422) that there are no blanks in the acquisition dates/times or the data values of the operation data received (step S27: No), the monitor controller 420 (regenerator 424) regenerates operation data in XML format from the operation data received (step S29).

On the other hand, when it is determined by the monitor controller 420 (regenerator 424) that there is a blank in an acquisition date/time or a data value of the operation data received (step S27: Yes), the monitor controller 420 (substitution identifier 423 and regenerator 424) accomplishes the following process in step S28.

That is to say, the monitor controller 420 (substitution identifier 423) compares the acquisition date/time containing the blank (space) identified by the monitor controller 420 (information identifier 422) and the acquisition date/time not containing a blank, and identifies the data changed to a blank. In addition, the monitor controller 420 (substitution identifier 423) compares the data value containing a blank (space) identified by the monitor controller 420 (information identifier 422) and the data value not containing a blank, and identifies the data changed to a blank. Then, the monitor controller 420 (regenerator 424) accomplishes regeneration of the acquisition date/time and the data value (regeneration of the operation data) by substituting the blank (space) with the data identified by the monitor controller 420 (substitution identifier 423).

Then, the monitor controller 420 (regenerator 424) generates operation data in XML format from the regenerated operation data (the operation data received when operation data with no blanks was received) (step S29).

Following this, the monitor controller 420 (regenerator 424) displays the generated operation data in XML format (see FIGS. 5A, 5B) on the output device 430 (step S30), and concludes this data receiving process.

As described above, when operation data is newly acquired, the data collector 300 of the monitoring system 10 of this exemplary embodiment compares the newly acquired operation data (acquisition date/time and data value) and the operation data (acquisition dates/times and data values) already stored in the operation data memory 340, and identifies the duplicated portion. Then, the data collector 300 appends operation data in which the identified duplicated portion is substituted with a blank (space) to the operation data already recorded. Then, the data collector 300 transmits the operation data to the monitoring device 400 in accordance with a request from the monitoring device 400.

When operation data transmitted from the data collector 300 is received, the monitoring device 400 determines whether or not there is a blank in the operation data (acquisition date/time or data value) received. Then, when it is determined that there is a blank, the monitoring device 400 identifies data substituted with a blank from the operation data received, and accomplishes regeneration of the operation data (acquisition date/time and data value) by substituting the identified data in place of the blank (space).

In this manner, because it is possible for the monitoring device 400 to regenerate operation data containing blanks, it is possible for the data collector 300 to transmit operation data in which blanks are substituted in place of duplicated portions to the monitoring device 400. The data collector 300 identifies the duplicated portion of the acquisition date/time and the duplicated portion of the data value, and substitutes blanks (spaces) for the duplicated portions. Hence, even if the acquisition date/time (information contents) of the newly acquired operation data and the acquisition date/time of operation data acquired previously differ, and even if the data value (information contents) of the newly acquired operation data and the data value of the operation data acquired previously differ, it is possible for the data collector 300 to reduce the volume of data used in expressing the acquisition date/time and the data value (the volume of data transmitted to the monitoring device 400). The monitoring system 10 of this exemplary embodiment is effective in the case of a meter rate charge system in which a utility charge of the communication network 500 varies linking with the volume of the transmitted data.

In addition, the data collector 300 transmits the operation data to the monitoring device 400 via the communication network 500 with a composition such that a user can easily grasp the contents, as shown in FIG. 3. Hence, even if the operation data is acquired by another communication device connected to the communication network 500, there is a low possibility that the protocol for sending and receiving signals, for example, used by the data collector 300 and the monitoring device 400 will be understood by a user of the other communication device. Accordingly, with the monitoring system 10 of this exemplary embodiment, it is possible to constantly preserve the security of the data collector 300 and the monitoring device 400.

In addition, the data collector 300 generates operation data having a composition with which it is easy for a user to analyze the operation data. In addition, the monitoring device 400 displays the operation data with a composition with which it is easy for a user to analyze the operation data. Hence, with the monitoring system 10 of this exemplary embodiment, it is possible to improve the efficiency of operation data analysis.

In addition, the data collector 300 causes operation data that the converter 322 has converted to text data from binary data to be stored in the operation data memory 340. Hence, by causing the information stored in the operation data memory 340 to be displayed on a display via an interface, for example, it is possible for a user to understand the operation data stored in the operation data memory 340.

The exemplary embodiment of the present disclosure was described above, but the present disclosure is not limited to the above-described exemplary embodiment, for various variations and applications are possible.

For example, the data collector 300 appended operation data in which a blank (space) has been substituted in place of the identified duplicated portion to the operation data already stored, but this is intended to be illustrative and not limiting. In other words, it would be fine for the data collector 300 to substitute data such as "*" or "?" and/or the like in place of the identified duplicated portion. In other words, it would be fine for the data collector 300 to substitute in place of the duplicated portion data that is smaller in volume than the information of the duplicated portion and that is not used in the operation data converted into text data.

In addition, in the above-described exemplary embodiment, the data collector 300 and the monitoring device 400 were each respectively single units, but this is intended to be illustrative and not limiting. That is to say, the data collector 300 and the monitoring device 400 may each be multiple units. Similarly, the outdoor equipment 110, the indoor equipment 120 and the remote control 130 may also each be multiple units.

In addition, it is possible for the monitoring device 400 of the above-described exemplary embodiment to be capable of editing the operation data in XML format, for example, displayed on the output device 430 through user operation of the input device 440, for example. In this case, it is possible for the user to edit the operation data in XML format to a format in which it is easy to analyze the operation data, so it is possible to improve operation data analysis efficiency.

In addition, the communication network 500 of the above-described exemplary embodiment may be a wireless communication network or may be a wired communication network. In addition, the communication network 500 may be a local communication network or may be a wide-area communication network via the Internet.

In addition, the data collector 300 and the monitoring device 400 of the above-described exemplary embodiment comprise hardware, but this is intended to be illustrative and not limiting. In other words, it would be fine for the data collector 300 and the monitoring device 400 to comprise software that realizes functions by being installed on a personal computer, for example. In addition, the data collector 300 and the monitoring device 400 may be comprised of software that operates on a Web server and a client computer connected to the Web server.

In addition, the air conditioning interface 310 of the above-described exemplary embodiment may be a serial interface or may be a wired or wireless network interface in accordance with communication protocol unique to the air conditioner 100.

In addition, with the above-described exemplary embodiment, the output device 430 was a liquid crystal display, but the liquid crystal display may be positioned on the outer surface of the casing of the monitoring device 400, for example. In addition, the output device 430 need not be a liquid crystal display, but may be an interface that outputs operation data to a controller that controls the entirety of the air conditioner 100 or a personal computer disposed externally. In addition, it would be fine for the output device 430 to comprise the above-described interface and a display device that displays operation data output from the interface. Furthermore, it would be fine for a memory to be connected to the output device 430, and for the output device 430 to be composed so as to store operation data on this memory.

In addition, in the above-described exemplary embodiment, the value of the operation mode (cooling or heating) and the value of the coolant temperature sensor were used as data values contained in the operation data, but this is intended to be illustrative and not limiting. That is to say, it is possible to use as data values contained in the operation data the set temperature of the indoor equipment 120, the value of the coolant pressure sensor, or the value of the indoor temperature sensor, and/or the like. Because the span of change of the set temperature is in units of hours, for example, and the span of change of the value of the operation mode is in units of days, for example, there is a high probability that a large number of blanks could be included in the operation data. Hence, when the data value is the set temperature or the value of the operation mode, there is a possibility of being able to greatly reduce the volume of the operation data.

In addition, the data collector 300 of the above-described exemplary embodiment was connected to the air conditioner 100 comprising the outdoor equipment 110, the indoor equipment 120 and the remote control 130, but this is intended to be illustrative and not limiting. That is to say, it would be fine for the data collector 300 to be connected to a lighting system comprising multiple lighting devices and a controller for controlling the light intensity of each lighting device, and to collect data indicating the light intensity of each lighting device. In addition, it would be fine for the data collector 300 to be connected to a home appliance system that acquires electric power consumed by home appliances and/or the like of a typical residence (a system for making it possible to understand the usage conditions of home appliances and/or the like), and to collect data indicating the consumed electric power of each home appliance and/or the like.

In addition, it would be fine for the logic sections of a single memory to be divided into multiple parts and for the operation data memory 340 of the above-described exemplary embodiment to comprise any of the logic sections. In addition, it would be fine for the operation data memory 340 to have the operation data partitioned and stored as multiple items in a single memory.

In the above-described exemplary embodiment, the program controlling the data collector 300 and the monitoring device 400 may be stored and distributed on a computer-readable non-transitory recording medium such as a flexible disk, CD-ROM (Compact Disc Read-Only Memory), DVD (Digital Versatile Disc), MO (Magneto-Operatic Disc) and/or the like, and the data collector 300 that executes the processes shown in FIG. 6 and FIG. 7 and the monitoring device 400 that executes the process shown in FIG. 8 may be comprised by installing that program on a computer and/or the like.

In addition, it would be fine for the above-described program to be stored on a disk device and/or the like possessed by a predetermined server device on a communication network such as the Internet and/or the like, and to be overlaid on carrier waves and downloaded and/or the like, for example.

In addition, when the processes shown in the above-described FIGS. 6-8 are realized by being partitioned by each OS (Operating System), or are realized through cooperation between the OS and applications, it would be fine for parts other than the OS to be stored and distributed on the medium, and to be downloaded and/or the like.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

REFERENCE SIGNS LIST

10 Monitoring system
100 Air conditioner
110 Outdoor equipment
120 Indoor equipment
130 Remote control
140 Coolant piping
200 Remote monitoring device
300 Data collector
310 Air conditioning interface
320 Controller
321 Acquirer
322 Converter
323 Duplication identifier
324 Substitutor
325 Memory controller
326 Transmitter
330 Communication interface
340 Operation data memory
400 Monitoring device
410 Communication network interface
420 Monitor controller
421 Receiver
422 Information identifier
423 Substitution identifier
424 Regenerator
430 Output device
440 Input device
500 Communication network

The invention claimed is:

1. A communication device comprising:
a controller; and
an information memory,
wherein the controller is configured to
acquire information in an acquirer;
compare, in a determiner, information newly acquired by the acquirer and information stored in the information memory, determine whether or not at least a portion of the newly acquired information matches a portion of the information stored in the information memory, and when it is determined that there is no matching portion, cause the information acquired by the acquirer to be stored in the information memory, and when it is determined that at least a portion of the newly acquired information matches a portion of the information stored in the information memory, substitute the information of the portion determined to match the information stored in the information memory among the newly acquired information with predetermined information with a smaller volume than the information of the portion, and cause the information which includes the predetermined information that has the smaller volume to be stored in the information memory;
identify, in an extractor, when the predetermined information is contained in information indicating an oldest acquisition timing among information requested for transmission, the information of the matching portion substituted with the predetermined information, substitute the predetermined information contained in the information indicating the oldest acquisition timing with the identified information, and extract the information requested for transmission from the information memory; and
transmit, by a transmitter, the information extracted by the extractor.

2. The communication device according to claim 1, wherein:
the information stored in the information memory contains acquisition timing of when the information was acquired by the acquirer; and
the controller is further configured to
compare, in the determiner, when information is newly acquired by the acquirer, the newly acquired information and information indicating a most recent acquisition timing among information not containing the predetermined information stored in the information memory, and identify the information of the matching portion.

3. The communication device according to claim 1, comprising:
a monitor controller configured to
receive, in a receiver, the information transmitted from the transmitter;
identify, in an information identifier, information containing the predetermined information and information not containing the predetermined information, contained in the information received by the receiver;
compare, in a substitution identifier, the information containing the predetermined information identified by the information identifier and the information not containing the predetermined information identified by the information identifier, and identifying information of the matching portion substituted with the predetermined information; and
regenerate, in a regenerator, information containing the predetermined information by substituting the predetermined information with the information of the matching portion identified by the substitution identifier.

4. The communication device according to claim 3, wherein the monitory controller is further configured to
identify, in the substitution identifier, when information is received by the receiver, the information of the matching portion substituted with the predetermined information, for each item of information containing the predetermined information, by comparing the information containing the predetermined information contained in the information received by the receiver, and information indicating a most recent acquisition timing among the information not containing the predetermined information and indicating an acquisition timing prior to an acquisition timing of the information.

5. The communication device according to claim 1, comprising:
a reception unit for receiving a selection of information transmitted from the transmitter by causing a user to specify an acquisition timing contained in the information; and
wherein the controller is further configured to
retrieve, in the extractor, when the predetermined information is contained in the information indicating an oldest acquisition timing among the information corresponding to the acquisition timing received by the reception unit, from the information memory, information indicating a most recent acquisition timing among the information not containing the predetermined information and indicating an acquisition timing prior to the information indicating the oldest acquisition timing, compare the retrieved information to the information indicating the oldest acquisition timing, identify the information of the matching portion substituted with the predetermined information, substitute the predetermined information contained in the information indicating the oldest acquisition timing with the identified information, and extract, from the information memory, the information corresponding to the acquisition timing received; and
transmit, by the transmitter, the information extracted by the extractor.

6. The communication device according to claim 1, wherein when the information acquired by the acquirer is converted to text data, the predetermined information is information not used in the text data.

7. The communication device according to claim 1, wherein:
the controller is further configured to convert, in a converter, the information acquired by the acquirer into text data; and
the communication device comprises an output device for outputting the text data converted by the converter.

8. A communication method for a communication device, the communication method including:
an acquisition step in which the communication device acquires information;
a determination step in which the communication device compares information newly acquired in the acquisition step and information stored in an information memory, and determines whether or not at least a portion of the newly acquired information matches a portion of the information stored in the information memory, and when it is determined that there is no matching portion causes the information acquired in the acquisition step to be stored in the information memory, and when it is determined that at least a portion of the newly acquired information matches a portion of the information stored in the information memory, substitutes the information of the portion determined to match the information stored in the information memory among the newly acquired information with predetermined information with a smaller volume than the information of the portion, and causes the information which includes the predetermined information that has the smaller volume to be stored in the information memory;
an extraction step in which the communication device identifies, when the predetermined information is contained in information indicating an oldest acquisition timing among information requested for transmission, the information of the matching portion substituted with the predetermined information, substitute the predetermined information contained in the information indicating the oldest acquisition timing with the identified information, and extract the information requested for transmission from the information memory; and
a transmission step in which the communication device transmits the information extracted in the extraction step.

9. The communication method according to claim 8, the communication method further comprising:
in a monitor controller,
receiving, in a receiver, the information transmitted from the transmitter;
identifying, in an information identifier, information containing the predetermined information and information not containing the predetermined information, contained in the information received by the receiver;
comparing, in a substitution identifier, the information containing the predetermined information identified by the information identifier and the information not containing the predetermined information identified by the information identifier, and identifying information of the matching portion substituted with the predetermined information; and
regenerating, in a regenerator, information containing the predetermined information by substituting the predetermined information with the information of the matching portion identified by the substitution identifier.

10. The communication method according to claim 9, further comprising, in the monitor controller,
identifying, in the substitution identifier, when information is received by the receiver, the information of the matching portion substituted with the predetermined information, for each item of information containing the predetermined information, by comparing the information containing the predetermined information contained in the information received by the receiver, and information indicating a most recent acquisition timing among the information not containing the predetermined information and indicating an acquisition timing prior to an acquisition timing of the information.

11. A computer-readable non-transitory recording medium that stores a program for causing a computer that controls a communication device to realize:
an acquisition function for acquiring information;
a determination function for comparing information newly acquired by the acquisition function and information stored in an information memory, and determining whether or not at least a portion of the newly acquired information matches a portion of the information stored in the information memory, and when it is determined that there is no matching portion causing the information acquired by the acquisition function to be stored in the information memory, and when it is determined that at least a portion of the newly acquired information matches a portion of the information stored in the information memory, substituting the information of the portion determined to match the information stored in the information memory among the newly acquired information with predetermined information with a smaller volume than the information of the portion, and causing the information which includes the predetermined information that has the smaller volume to be stored in the information memory;

an extraction function for identifying, when the predetermined information is contained in information indicating an oldest acquisition timing among information requested for transmission, the information of the matching portion substituted with the predetermined information, substituting the predetermined information contained in the information indicating the oldest acquisition timing with the identified information, and extracting the information requested for transmission from the information memory; and a transmission function for transmitting the information extracted by the extraction function.

12. The computer-readable non-transitory recording medium according to claim 11, wherein the program for causing the computer that controls the communication device further comprises:

a function, in a monitor controller, for
receiving, in a receiver, the information transmitted from the transmitter;
identifying, in an information identifier, information containing the predetermined information and information not containing the predetermined information, contained in the information received by the receiver;
comparing, in a substitution identifier, the information containing the predetermined information identified by the information identifier and the information not containing the predetermined information identified by the information identifier, and identifying information of the matching portion substituted with the predetermined information; and
regenerating, in a regenerator, information containing the predetermined information by substituting the predetermined information with the information of the matching portion identified by the substitution identifier.

13. The computer-readable non-transitory recording medium according to claim 12, wherein the program for causing the computer that controls the communication device further comprises, in the monitor controller:

identifying, in the substitution identifier, when information is received by the receiver, the information of the matching portion substituted with the predetermined information, for each item of information containing the predetermined information, by comparing the information containing the predetermined information contained in the information received by the receiver, and information indicating a most recent acquisition timing among the information not containing the predetermined information and indicating an acquisition timing prior to an acquisition timing of the information.

14. A monitoring system comprising:
the communication device according to claim 1; and equipment;
wherein the acquirer acquires the information transmitted from the equipment.

\* \* \* \* \*